United States Patent Office 3,252,977
Patented May 24, 1966

3,252,977
PROCESS FOR THE PREPARATION OF ESTER AMIDES OF CARBOCYCLIC AROMATIC DI-CARBOXYLIC ACIDS
Gustav Renckhoff, Witten (Ruhr), and Hans Leo Huelsmann, Witten-Ruedinghausen, Germany, assignors to Chemische Werke Witten G.m.b.H., Witten (Ruhr), Germany
No Drawing. Filed Apr. 3, 1963, Ser. No. 270,205
Claims priority, application Germany, July 7, 1962, C 27,407
13 Claims. (Cl. 260—247.2)

The present invention is directed to a process for the preparation of ester amides of carbocyclic aromatic dicarboxylic acids having m- and p-positioned carboxyl groups, particularly iso- and terephthalic acids.

Among the ester amides of the carbocyclic aromatic dicarboxylic acids, for example, the ester amides of the benzene dicarboxylic acids, particularly the ester amides of terephthalic acid have attained considerable technical importance. The N-alkylterephthalamide acid esters, for example, constitute the preliminary preparation stages of the metal terephthalamates which are significant as thickening agents for lubricating greases. The sodium salt of the N-octadecylterephthalic acid monoamide has gained special importance. Also, the ester amides derived from diamines, for example, bis(p-carbomethoxybenzoyl)ethylenediamine, are of technical interest as starting materials for the preparation of polycondensation products having mixed ester and amide bonds.

In the preparation of such ester amides, it has heretofore been necessary to start with terephthalic acid alkyl ester chlorides which were reacted, for example, according to the German Auslegeschrift (DAS) 1,028,985, as such in the presence of acid-binding substances with the corresponding amines, or as were obtained as intermediate products in accordance with the procedure described in DAS 1,109,664 during the reaction of terephthalic acid monoesters with primary amines and phosphorus halides in the presence of tertiary amines.

Even though economic methods for preparing the terephthalic acid monoalkyl ester chlorides have been found in recent years, working with these highly reactive and extremely corrosive acid chlorides nevertheless involves many complications and difficulties as to the apparatus used.

It has now been found that ester amides of carbocyclic aromatic dicarbovylic acids with m- or p-positioned carboxyl groups, particularly of iso- and terephthalic acid, may be easily obtained with an excellent yield and degree of purity by reacting the methyl aryl esters of the dicarboxylic acids with ammonia or primary or secondary mono- or diamines, preferably in equivalent amounts, in inert organic solvents at temperatures of from 0 to 150° C., particularly at 60 to 100° C. The aryl residue of the methyl aryl esters to be employed in accordance with the present invention may be derived from monohydric phenols or naphthols which may be substituted, if desired, by one or several alkyl or aralkyl groups, for example, from phenol, or from the isomeric cresols or xylenols, butylphenols, octylphenols, benzylphenols, β-naphthol, etc.

As starting materials for the preparation of the methyl aryl esters of carbocyclic aromatic dicarboxylic acids to be employed according to the present invention, the dimethyl esters of the carbocyclic aromatic dicarboxylic acids and their nuclear-substitution products with m- or p-positioned carboxyl groups are utilized, the methyl aryl esters of which may be distilled undecomposed so that their separation from the unreacted dimethyl esters is possible; for example, iso- and terephthalic acid, the diphenyl dicarboxylic acids, and the iso- and terephthalic acids having one or two substituent groups in the nucleus, for example the 5-chloroisophthalic acid or nitroterephthalic acids.

The methyl aryl esters may be made, for example, by heating the dimethyl esters of the carbocyclic aromatiic dicarboxylic acids with equivalent amounts or a slight excess of phenol and/or phenols and/or naphthols substituted by one or several alkyl and/or aralkyl groups in the presence of ester-radical interchange catalysts to temperatures above 160° C. until completion of the methanol cleavage, and thereafter distilling the reaction mixture to separate the unreacted dimethyl ester and diaryl ester, which are returned to a new ester-radical interchange batch, from the obtained methyl aryl esters of the carbocyclic aromatic dicarboxylic acids. When employing the methyl aryl esters prepared according to the process described herein, the phenolic component is recovered by distillation and crystallization, after the reaction to the ester amides and after separation of the ester amides, and returned into the ester-radical interchange stage.

Surprisingly, only the aryl ester group enters into reaction with the amine and the ester amide is therefore obtained in a practically quantitative yield, relative to the amount of dimethyl ester reacted, since the yield of the methyl aryl esters of the dicarboxylic acid will also be practically quantitative, relative to the amount of dimethyl ester reacted, due to the return of the dimethyl and diaryl ester fractions into the ester-radical interchange stage.

Aside from ammonia, primary and secondary aliphatic or aromatic or heterocyclic mono- or diamines may be employed as the amine components, particularly the primary alkyl amines having 10 to 18 carbon atoms, and the primary diamines having 2 to 6 carbon atoms, such as ethylenediamine or hexamethylenediamine.

It is a primary object of the present invention, therefore, to provide a new and improved process for the production of the ester amides of carbocyclic aromatic dicarboxylic acids with m- or p-positioned carboxyl groups.

Further objects of the present invention will become apparent from the description thereof hereinbelow.

The ester amides obtained in accordance with the present invention may be utilized in a manner known per se, for example, for the preparation of thickening agents for greases, and as base materials for the preparation of polycondensation products.

The following examples serve to further illustrate the present invention, without limiting the same.

*Example I*

A solution of 25.6 parts by weight of methyl phenyl terephthalate (0.1 mol) in 100 parts by volume of benzene is heated to the boiling point in a reflux condenser, and a solution of 27.0 parts by weight of stearylamine (0.1 mol) in 100 ml. of benzene is proportionately added over a period of two hours, whereby the solvent boils constantly. Upon completion of the addition of the amine solution, the batch is further heated to about 80° C. for an hour. Subsequently, benzene and phenol, which are recovered quantitatively, are distilled off. A residue consisting of 42.5 parts by weight of N-octadecylterephthalamide acid methyl ester (corresponding to 98.6% of the theory) having a melting point of 113–114° C. remains.

After recrystallization from butyl acetate, the melting point is at 115–116° C. The acid number is 0, the saponification number 127 (calculated=130), and percent N=3.4 (calculated=3.25%).

The methyl phenyl terephthalate used had been obtained in the following manner:

Example II 750 parts by weight of dimethyl terephthalate (about 3.9 mol) are heated while stirring with 730 parts by weight of phenol (about 7.8 mol) and 37.5 g. preliminary-run-fatty-acid zinc (about 2.5% by weight of the initial weight) as catalyst in a flask equipped with fractionating column, while a nitrogen stream of 1,300 parts by volume/min. is passed through the apparatus. The escaping gas stream passes through a descending cooler and a cooling trap kept at —50° C. The sump temperature rises constantly during the ester radical interchange from 192° C. to 220° C. The methanol formed in the course of the reaction is distilled off at temperatures up to a maximum of 64° C. at the top of the column. After 10 hours, the batch is distilled in vacuo. After distillation of the non-reacted phenol and dimethyl terephthalate, 466 parts by weight of pure methyl phenyl terephthalate distill over at between 215 and 230° C. and 11 torr. The ester melts at 109–110° C. The acid number thereof is 0.9, and the saponification number 439 (calculated=437).

408 parts by weight of diphenyl terephthalate remain as residue after distilling off the methyl phenyl terephthalate. They are again employed in the ester-radical interchange described hereinbelow. When taking into account the recovered dimethyl terephthalate (133 parts by weight), the yield of methyl phenyl terephthalate is 57% of the theory, and of diphenyl terephthalate 40.5% of the theory, referred to the dimethyl terephthalate which was ester-radical interchanged.

The distillation residue (445.5 parts by weight) which contains 408 parts by weight of diphenyl terephthalate, is heated in the same manner with 527 parts by weight of terephthalic acid dimethyl ester and 517 parts by weight of phenol (molar ratio about 1:2) for 10 hours to 198–215° C. while distilling off the freed methanol. Then the batch is distilled in vacuo. After distilling off the non-reacted phenol and dimethyl terephthalate, 525 g. of pure methyl phenyl terephthalate, which distills over at between 215–230° C./11 torrs, are thereby obtained. The melting point of the ester is at 109–110° C.; the acid number is 1, and the saponification number 436 (calculated=437).

363 parts by weight of diphenyl terephthalate remain as residue after distillation of the methyl phenyl terephthalate.

When taking into account the dimethyl terephthalate (152 parts by weight) and diphenyl terephthalate returned unchanged, the yield of methyl phenyl terephthalate amounts to 98.5% of the theory, referred to the dimethyl and diphenyl terephthalate reacted.

Example III

A solution of 20.0 parts by weight of methyl phenyl terephthalate (0.078 mol) in 100 parts by volume of xylene is heated to the boiling point after the addition of 2.35 parts by weight of ethylenediamine (0.039 mol) for one hour on the reflux condenser. During cooling to room temperature, bis-(p-carbomethoxybenzoyl) ethylenediamine is precipitated. It is suctioned off, washed repeatedly with cold xylene and dried. The yield amounts to 13.5 parts by weight corresponding to 90.0% of the theory. The acid number of the ester amide is 0.9, the saponification number 296 (calculated=292), and percent N=6.9% (calculated=7.3%). After recrystallization from dimethyl formamide, the melting point is at 298–300° C.

Example IV

A solution of 25.6 parts by weight of methyl phenyl isophthalate (0.1 mol), obtained by ester-radical interchange of dimethyl isophthalate with phenol in accordance with the process described in Example I above with an approximately quantative yield, in 100 parts by volume of benzene is heated to the boiling point on the reflux condenser, and a solution of 27.0 parts by weight of stearylamine (0.1 mol) in 100 ml. of benzene is added proportionately over a period of two hours, whereby the solvent boils constantly. After completion of the addition of the amine solution, the batch is further heated to about 80° C. for an hour. Subsequently, benzene and phenol, which are recovered quantitatively, are distilled off. There remain as residue 42.5 parts by weight of N-octadecylisophthalamide acid methyl ester (corresponding to 96.2% of the theory), having a melting point of 95–96° C. After recrystallization from methanol (the melting point is unchanged. The acid number is 0, the saponification number 129 (calculated=130), and percent N=3.4% (calculated=3.25%).

Example V

A solution of 51.2 parts by weight of methyl phenyl isophthalate (0.2 mol) in 100 parts by volume of benzene is reacted with a solution of 31.4 parts by weight of decylamine (0.2 mol) in 200 parts by volume of benzene, as described in Example I. After distillation of the solvent and of the phenol, 63.8 parts by weight of N-decylisophthalamide acid methyl ester are obtained, corresponding to 100% of the theory. The melting point, after recrystallization from methanol, is at 87° C. The acid number is 0, and the saponification number is 174.5 (calculated as 175.5), percent N=4.5% (calculated as 4.4%).

Example VI

A solution of 51.2 parts by weight of methyl phenyl isophthalate (0.2 mol) in 100 parts by volume of benzene is reacted with a solution of 42.6 parts by weight of tetradecylamine (0.2 mol) in 200 parts by volume of benzene, as described in Example I. Upon the completion of the reaction, benzene and phenol are distilled off. There remain 74.4 parts by weight of N-tetradecylisophthalamide acid methyl ester corresponding to 99% of the theory. The ester amide melts, after recrystallization from methanol, at 89° C. The acid number is 0.6, and the saponification number is 144 (calculated as 149), percent N=3.75% (calculated as 3.7%).

Example VII 51.2 parts by weight of methyl phenyl isophthalate (0.2 mol) are reacted with 62.2 parts by weight of "Fatty Amine D 20/22" (Hoechst) in benzene as solvent, as described in Example I. After the distillation of the benzene and phenol, there remain 89.7 parts by weight of ester amides of primary $C_{20-22}$ amines, corresponding to 95% of the theory. After recrystallization from methanol, the melting point is at from 98 to 100.5° C. The acid number is 0.5, and the saponification number is 116.5 (calculated as 118), percent N=3.3% (calculated as 3.0%).

Example VIII

A solution of 15.7 parts by weight of decylamine (0.1 mol) in 200 parts by volume of benzene is added dropwise, with stirring, to a solution of 27.0 parts by weight of terephthalic acid methyl phenyl ester (0.1 mol) in 150 parts by volume of benzene over a period of 2 hours, while the solvent continuously boils under reflux. Upon completion of the addition, stirring is continued for another hour at 80° C. Then, the benzene and phenol are distilled off. As residue, there remain 30.7 parts by weight of methylterephthalic acid methyl ester-N-decylamide (92% of the theory) which melts, after recrystallization from methanol, at from 62 to 66° C. The saponification number is 171 (calculated as 169), percent N= 4.3% (calculated as 4.2%).

Example IX

A solution of 7.85 parts by weight of decylamine (0.05 mol) are added in portions to a solution of 15.3 parts by weight of 2,6-naphthalene dicarboxylic acid methylphenyl ester (0.05 mol) in 200 parts by volume of benzene during one hour, while the solvent boils under reflux. The treatment is carried out as described in Example I. After distillation of 4.7 parts by weight of phenol (calculated as 4.7 parts by weight), 17.8 parts by weight of 2,6-naphthalene dicarboxylic acid methyl ester-N-decylamide are obtained, corresponding to 96% of the theory. After recrystallization from methanol, the melting point is at from 126 to 127° C.

*Example X*

16.6 parts by weight of 4,4'-diphenyl dicarboxylic acid methyl phenyl ester (0.05 mol) dissolved in 150 parts by volume of benzene are brought to reaction as described above with 13.5 parts by weight of octadecylamine (0.05 mol) dissolved in 150 parts by volume of benzene. After the distillation of the benzene and phenol, 20.3 parts by weight of 4,4'-diphenyl dicarboxylic acid methyl ester-N-octadecylamide are obtained (80% of the theory). The crude product melts at from 148 to 154° C. After recrystallization from methyl isobutyl ketone, the melting point is at from 152 to 155° C.

*Example XI*

51.2 parts by weight of methyl phenyl terephthalate (0.2 mol) are heated to 130° C. in the autoclave for 5 hours with a solution of 10.2 parts by weight of ammonia (0.6 mol) in 400 parts by weight of dioxane. During cooling of the solution, 14.7 parts by weight of terephthalamide acid methyl ester are precipitated having a melting point of 206° C. The crystallizate is suctioned off; the filtrate is evaporated to dryness, and the evaporation residue is dissolved in 100 parts by volume of acetone. Upon the addition of 250 parts by volume of water, a colorless crystalline substance is precipitated. The same is dried and eluted with 200 parts by volume of ligroin at the boiling temperature thereof. There remain another 2.0 parts by weight of terephthalamide acid methyl ester having a melting point of 206° C. From the ligroin solution, 24.6 parts by weight of methyl phenyl terephthalate are recovered having a melting point of from 108 to 110° C. When taking into account the unreacted methyl phenyl terephthalate, the yield of terephthalamide acid methyl ester is 90% of the theory.

*Example XII*

A solution of 8.7 parts by weight of morpholine in 100 parts by volume of benzene is added dropwise to a solution of 25.6 parts by weight of methyl phenyl terephthalate in 100 parts by volume of benzene within ½ hour at 50° C. Subsequently, heating is continued for another 5 hours to the boiling point. After the distillation of the benzene and the phenol formed (9 parts by weight), 23 parts by weight of terephthalic acid methyl ester morpholide are obtained as residue, corresponding to a yield of 93%. After recrystallization from butyl acetate, it forms shining laminae which melt at from 75 to 75.5° C.

*Example XIII*

8.5 parts by weight of piperidine, dissolved in 100 parts by volume of benzene, are added dropwise within 1 hour at 50° C. to a solution of 25.6 parts by weight of methyl phenyl terephthalate in 100 parts by volume of benzene. Subsequently, heating is continued for 2 hours to the boiling point. After the distillation in vacuo of the benzene and of the phenol formed, there remain 23 parts by weight of terephthalic acid methyl ester piperidide, corresponding to a yield of 93%. After recrystallization from ligroin, the compound melts at from 69 to 70° C. Nitrogen content: 5.33% (calculated as 5.65%).

*Example XIV*

A solution of 58 parts by weight of hexamethylenediamine (0.5 mol) in 600 parts by volume of benzene is added dropwise and while stirring to a solution of 257.5 parts by weight of methyl phenyl terephthalate (1.005 mol) in 1,000 parts by volume of xylene in a nitrogen atmosphere at from 80 to 100° C. and within 1 hour. Subsequently, heating is continued while stirring for another 5 hours on the reflux condenser under nitrogen. The separation of the ester amide in the form of fine shining laminae begins prior to the completion of the addition of the hexamethylenediamine solution. After completion of the reaction, cooling is effected under nitrogen and the crystallized ester amide is suctioned off. For purification, it is heated twice to the boiling point with 1,000 parts by volume of xylene each time, cooled again and suctioned off. After drying at 120° C., 208 parts by weight of N,N'-bis(p-carbomethoxybenzoyl)hexamethylenediamine are obtained having a melting point of 236° C. The saponification number is 256.5 (calculated as 256). The yield of the pure product corresponds to 94.5% of the theory.

*Example XV*

A solution of 13.6 parts by weight of p-xylylenediamine (0.1 mol) in 40 parts by volume of benzene is added dropwise and within 1 hour to a boiling solution of 56.3 parts by weight of methyl phenyl terephthalate (0.22 mol) in 120 parts by volume of xylene under a nitrogen atmosphere and while stirring. Subsequently, heating to the boiling point is continued for 6 hours under reflux, whereby the ester amide crystallizes out in beautiful shining laminae. Upon the completion of the reaction, cooling is effected; the crystalline product suctioned off and briefly brought to boiling twice within 200 parts by volume of xylene each time, cooled again and suctioned off. After drying, 43 parts by weight of N,N'-bis(p-carbomethoxybenzoyl)-p-xylylenediamine are obtained, corresponding to a yield of 93.5%, having a melting point of from 261–262° C. and a saponification number of 245 (calculated as 244).

*Example XVI*

A solution of 31.4 parts by weight of n-decylamine (0.2 mol) in 200 parts by volume of benzene is added dropwise and within 2 hours to a solution of 54 parts by weight of methyl m-cresyl terephthalate (0.2 mol) in 200 parts by volume of benzene at boiling heat and while stirring. Then, heating is continued to the boiling point for another hour. After the distillation of the benzene and the m-cresol freed (21 parts by weight), there remain as residue 63 parts by weight (calculated as 63.8) of N-decylterephthalamide acid methyl ester which melts, after recrystallization from methanol, at from 113 to 114° C. The saponification number is 175.4 (calculated as 176).

*Example XVII*

A solution of 58 parts by weight (½ mol) of hexamethylenediamine in 500 parts by volume of xylene is added within 1 hour and at a temperature of from 80 to 100° C. under a nitrogen atmosphere to a solution of 270 parts by weight (1 mol) of methyl m-cresyl terephthalate in 1,000 parts by volume of xylene. Subsequently, heating is continued to the boiling point for 2 hours. From the initially clear solution, shining crystalline laminae are gradually precipitated thereby. After cooling, the laminae are separated by suction and rinsed with cold xylene. 191 parts by weight of N, N'-bis-(p-carbomethoxybenzoyl)hexamethylenediamine are obtained, corresponding to a yield of 88%, having a melting point of 236° C., the saponification number of 255.5 (calculated as 256), and a nitrogen content of 6.5% (calculated as 6.4%). By a distillative treatment of the xylene mother liquor, 105 parts by weight of m-cresol are recovered, calculated at 108 parts.

*Example XVIII*

A solution of 26.9 parts by weight (0.1 mol) of stearylamine in 100 parts by volume of benzene is added dropwise to a boiling solution of 31.2 parts by weight (0.1 mol) of terephthalic acid methyl 4-tert-butylphenyl ester in 100 parts by volume of benzene within 1 hour. Thereafter, the reaction mixture is heated for another hour at the boiling point. After the complete distillation of the benzene, the 4-tert-butylphenol formed is distilled off at 2 torr and at a sump temperature of 160° C. 15 parts by weight are obtained, corresponding to a quantitative yield. In the residue, there remain 42 parts by weight of N-octadecylterephthalamide acid methyl ester, corresponding to a yield of 98%. After recrystallization from butyl acetate, the compound melts at from 116 to 117° C.

*Example XIX*

A solution of 26.9 parts by weight (0.1 mol) of stearylamine in 100 parts by volume of benzene is added dropwise and within 1 hour to a boiling solution of 28.4 parts by weight (0.1 mol) of methylterephthalic acid methyl o-cresyl ester in 100 parts by volume of benzene. After completion of the addition, heating is continued for another hour to the boiling point. When the benzene has been completely distilled off, the o-cresol formed is distilled off at 2 torr and at a sump temperature of 130° C. In the residue, there remain 44 parts by weight (calculated as 44.5) of N-octadecylmethylterephthalamide acid methyl ester which melts, after recrystallization from butyl acetate, at from 72 to 74° C. The saponification number is 127 (calculated as 126.5).

*Example XX*

8.7 parts by weight (0.1 mol) of morpholine in 100 parts by volume of benzene are added dropwise to a boiling solution of 28.4 parts by weight (0.1 mol) of isophthalic acid methyl (3,5-dimethylphenyl) ester in 100 parts by volume of benzene within 1 hour. Thereafter, heating is continued to the boiling point for another 3 hours. After the distillation of the benzene under a water jet vacuum, 12 parts by weight of xylenol are distilled initially at 0.2 torr, and subsequently, at from 170 to 175° C., and at 0.2 torr, 24 parts by weight of isophthalic acid methyl ester morpholide, corresponding to a yield of 96%. Nitrogen content 5.1% (calculated as 5.62%).

*Example XXI*

An autoclave from VA steel with a volume of 900 parts by volume is charged with 54.0 parts by weight of methyl m-cresyl terephthalate (0.2 mol), 400 parts by weight of dioxane and 27.5 parts by volume of liquid ammonia (about 1 mol) and heated to 130 to 133° C. within 6 hours. The pressure is about 12 atmospheres. After the expiration of this time, the autoclave is cooled and relieved from pressure. The terephthalamide acid methyl ester which crystallized out of the dioxane solution in colorless shining laminae is suctioned off, washed with cold methanol and dried at 120° C. The melting point is at 206° C. The yield is 32.0 parts by weight, corresponding to 89.5% of the theory, referred to the methyl m-cresyl terephthalate employed. The doxane, as well as the m-cresol, cleaved off during the reaction may be recovered by distillation of the filtrate practically without loss.

*Example XXII*

A solution of 42.6 parts by weight (0.2 mol) of tetradecylamine in 100 parts by volume of benzene is added dropwise to a boiling solution of 61.2 parts by weight (0.2 mol) of terephthalic acid methyl β-naphthyl ester in 200 parts by volume of benzene within 2 hours. After boiling for 1 hour, the benzene is distilled off and thereafter the major amount of the β-naphthol freed is removed at 0.2 torr up to a sump temperature of 170° C. The residue is digested with cold 2N-soda lye for the removal of any possibly still adhering amounts of β-naphthol. There remain 72 parts by weight (corresponding to 96% of the theory) of N-tetradecylterephthalamide acid methyl ester which melts, after recrystallization from a mixture of 90 parts by volume of methanol and 10 parts by volume of butyl acetate at from 110 to 111° C. The saponification number is 147.5 (calculated as 149).

*Example XXIII*

A solution of 24.1 parts by weight (0.1 mol) of hexadecylamine in 100 parts by volume of benzene is added dropwise with stirring to a boiling solution of 34.6 parts by weight (0.1 mol) of isophthalic acid methyl benzylphenyl ester in 100 parts by volume of benzene within 1 hour. Subsequently, additional stirring is made at boiling temperature for another hour. After distillation of the solvent, the benzylphenol freed is distilled off at 0.2 torr up to a sump temperature of 190° C. From the residue, 32 parts by weight (80% of the theory) of N-hexadecylisophthalamide acid methyl ester are obtained after recrystallization from methanol, having a melting point of from 91 to 92° C.

*Example XXIV*

54 parts by weight (0.2 mol) of terephthalic acid methyl m-cresyl ester and 18.6 parts by weight (0.2 mol) of aniline are heated to 130 to 140° C. in 27 parts by weight of dry xylene for 8 hours. After cooling, the precipitated terephthalic acid methyl ester anilinide is suctioned off and washed with some xylene. The freed cresol may be obtained by distillative treatment of the filtrate. The methyl ester anilinide melts, after recrystallization from xylene, at 193° C., corresponding to the statements found in the literature. As the complete solublility of the raw product in boiling xylene shows, no dianilide is formed. The yield is 40 g. of pure product, corresponding to 78% of the theory.

*Example XXV*

2.7 parts by weight of 2,5-dichloroterephthalic acid methyl phenyl ester (0.0083 mol) and 2.3 parts by weight of octadecylamine (0.0085 mol) are heated to 80° C. for 1 hour in 25 parts by volume of benzene. During cooling of the solution to 0° C., 2,5-dichloroterephthalic acid methyl ester-N-octadecylamide is precipitated in colorless crystals. The crystallizate is suctioned off, washed with some cold benzene and dried. The melting point of the crude product is at 96° C. It is recrystallized from a mixture of 10 parts by volume of butyl acetate and 5 parts by volume of methanol. 3.1 parts by weight of pure 2,5-dichloroterephthalic acid methyl ester-N-octadecylamide are obtained, corresponding to 75% of the theory. The melting point is at 99.5 to 100° C. The saponification number is 110.3 (calculated as 112), and the percent Cl is 14.0% (calculated as 14.1%).

We claim:

1. A process for the preparation of ester amides of carbocyclic aromatic dicarboxylic acids which comprises reacting a methyl aryl ester of an acid selected from the group consisting of carbocyclic aromatic dicarboxylic acids having the carboxyl groups thereof positioned meta with respect to each other and carbocyclic aromatic dicarboxylic acids having the carboxyl groups thereof positioned para with respect to each other with a nitrogen-containing compound selected from the group consisting of ammonia, primary monoamines, primary diamines, secondary monoamines and secondary diamines.

2. The process of claim 1, wherein said acid is isophthalic acid.

3. The process of claim 1, wherein said acid is terephthalic acid.

4. The process of claim 1, wherein the amounts of said ester and of said nitrogen-containing compound utilized are such that the molar number of aryl ester groups to be reacted is approximately equivalent to the molar number of nitrogen-containing groups to be reacted.

5. The process of claim 1, wherein said methyl aryl ester is the methyl phenyl ester.

6. A process for the preparation of ester amides of carbocyclic aromatic dicarbocylic acids which comprises reacting a methyl aryl ester of an acid selected from the group consisting of carbocyclic aromatic dicarboxylic acids having the carboxyl groups thereof positioned meta with respect to each other and carbocylic aromatic dicarboxylic acids having the carboxyl groups thereof positioned para with respect to each other with a nitrogen-containing compound selected from the group consisting of ammonia, primary monoamines, primary diamines, secondary monoamines and secondary diamines at temperatures of from about 0° to 150° C.

7. The process of claim 6, wherein the reaction is carried out in an inert organic solvent.

8. The process of claim 7, wherein the inert organic solvent is an aromatic hydrocarbon.

9. The process of claim 6, wherein the reaction is carried out at a temperature of from 60° to 100° C.

10. The process of claim 6, wherein the amounts of said ester and of said nitrogen-containing compound utilized are such that the molar number of aryl ester groups to be reacted is approximately equivalent to the molar number of nitrogen-containing groups to be reacted.

11. A process for the preparation of ester amides of terephthalic acid and isophthalic acid which comprises reacting a methyl aryl ester of an acid selected from the group consisting of terephthalic acid and isophthalic acid with a nitrogen-containing compound selected from the group consisting of ammonia, primary monoamines, primary diamines, secondary monoamines, and secondary diamines in an inert organic solvent at temperatures of from 0° to 150° C.

12. The process of claim 11, wherein the amounts of said ester and of said nitrogen-containing compound utilized are such that the molar number of aryl ester groups to be reacted is approximately equivalent to the molar number of nitrogen-containing groups to be reacted.

13. The process of claim 12, wherein said methyl aryl ester is the methyl phenyl ester.

No references cited.

NICHOLAS S. RIZZO, *Primary Examiner.*

J. TOVAR, *Assistant Examiner.*